United States Patent [19]
Holcomb et al.

[11] 4,358,559
[45] Nov. 9, 1982

[54] TACKY FLUOROELASTOMER COMPOSITIONS

[75] Inventors: Allen G. Holcomb, Mahtomedi, Minn.; Bruce H. Spoo, Baldwin, Wis.

[73] Assignee: Minnesota Mining and Manufacturing Company, St. Paul, Minn.

[21] Appl. No.: 322,970

[22] Filed: Nov. 19, 1981

[51] Int. Cl.³ .................. C08L 23/28; C08L 23/32
[52] U.S. Cl. .................. 524/380; 525/187; 525/340; 525/353; 525/359.3
[58] Field of Search .................. 524/380; 525/359.3, 525/340, 353

[56] References Cited

U.S. PATENT DOCUMENTS

| | | | |
|---|---|---|---|
| 2,807,648 | 9/1957 | Pitt | 260/607 |
| 2,968,649 | 1/1961 | Pallthorp et al. | 260/80.5 |
| 3,051,677 | 8/1962 | Rexford | 260/29.6 |
| 3,147,314 | 9/1964 | Cluff | 260/837 |
| 3,318,854 | 5/1967 | Honn et al. | 260/87.7 |
| 3,413,271 | 11/1968 | Woemer | 260/77.5 |
| 3,574,770 | 4/1971 | Paise | 260/615 |
| 3,647,891 | 3/1972 | Loudas et al. | 260/633 |
| 3,647,897 | 3/1972 | Lakodey et al. | 260/666 PY |
| 4,027,086 | 5/1977 | Lo Valvo et al. | 526/79 |
| 4,094,911 | 6/1978 | Mitsch et al. | 260/615 A |
| 4,148,982 | 4/1979 | Morozumi et al. | 526/58 |
| 4,188,352 | 2/1980 | Suzuki et al. | 525/187 |
| 4,250,278 | 2/1981 | Suzuki et al. | 525/340 |

FOREIGN PATENT DOCUMENTS 2856526 7/1979 Fed. Rep. of Germany .
817809 7/1968 Italy .
815768 6/1970 Italy .

OTHER PUBLICATIONS

D. A. Stivers, "Fluorocarbon Rubbers", Rubber Technology, 2d Ed. p. 431 M. Morion Ed., (Van Nostrand Reinhold Co., New York, 1973).
E. T. McBee et al., JACS, 74, 444–446 (1952).
E. T. McBee et al., JACS, 75, 2324 (1953).
J. Org. Chem., K. Ohkubo, et al., 36, 3149–3155 (1971).
"Topics in Sulfur Chemistry", J. P. Marino, (Georg Thieme, Stuttgart, 1976) p. 32.
"Psuedohalo Metal Compounds XVIII", Beck et al., Chem Ber, 100, 2335–2361 (1967).
"Organic Phosphorus Compounds", G. M. Kosolapoff and L. Maier, (Wiley-Interscience, New York, 1972) vol. 2. p. 189.
J. Org. Chem., G. H. Wiegand, et al., 33, 2671–2675 (1968).
J. L. Zollinger et al., "Polymers in Space Research", 409–430 (Marcel Decker, Inc. N.Y. 1970).
J. D. LaZerte et al., JACS, 77, 910 (1955).
"Concerning Amines", David Ginsburg, (Pergamon Press, New York, 1967) p. 73.

Primary Examiner—Joseph L. Schofer
Assistant Examiner—N. Sarofim
Attorney, Agent, or Firm—Cruzan Alexander; Donald M. Sell; David R. Cleveland

[57] ABSTRACT

A tacky gum stock composition comprising fluoro-elastomer gum, an excess of a curing amount of normally liquid fluoroaliphatic polyol or normally liquid mixture thereof, organo-onium compound, and acid acceptor is shaped and cured to form shaped elastomeric articles.

10 Claims, No Drawings

TACKY FLUOROELASTOMER COMPOSITIONS

Technical Field

This invention relates to tackified fluoro-elastomer gum stock compositions, curable tackified fluoroelastomer gum stock compositions, and a method for rendering fluoroelastomer gum stock compositions tacky in order to bond together such gum stock compositions or bond such compositions to cured fluoroelastomer articles.

BACKGROUND ART

Because most commercially available curable fluoroelastomer gum stocks are not "tacky", sheets of such curable gum stocks do not readily adhere to one another. This lack of tackiness makes it difficult to form rollers from fluoroelastomers using conventional roll-building techniques, which calendered sheets of uncured rubber are wrapped around a mandrel and cured. Two previously reported methods for providing a tacky curable fluoroelastomer gum stock are Italian Pat. No. 815,768, in which shaped, non-vulcanized, fluoroelastomer gum stock is sprayed with an organic liquid having a boiling point above 80° C., and U.S. Pat. No. 4,148,982, in which shaped fluoropolymer gum is thermally modified by heating in the presence of oxygen. Bonding of uncured, shaped fluoroelastomer gum stocks to dissimilar substrates has been carried out using an amino silane primer in methanol or a mixture of amino silane primer and vinyl silane primer in methanol, but these bonding methods require care to prevent voids or delamination due to escape of volatiles during cure, see D. A. Stivers, "Fluorocarbon Rubbers", Rubber Technology, 2d Ed., p. 431 M. Morton, Ed., (Van Nostrand Reinhold Co., New York, 1973).

Also, it is very difficult to repair tears and other damage to cured fluoroelastomer articles such as tank liners and flue ducts. Such repairs can be carried out using epoxy adhesive, see Stivers, id. at 431, but the repaired area will generally lack the thermal and chemical resistance of the undamaged fluoroelastomer.

Low (i.e., curing) amounts of certain fluoro-aliphatic diols have been used as curing components of fluoroelastomer gum stocks. For example, German Offenlegungsschrift No. 28 56 526 and U.S. Pat. No. 4,188,352 describe gum stock compositions containing a fluoropolymer gum, epichlorohydrin gum, an acid acceptor, a curing accelerator (certain tertiary amines, salts of those amines, or certain phosphorous compounds), and a fluorine-containing polyhydroxy compound. The fluorine-containing polyhydroxy compounds said to be useful in such gum stock compositions include the fluoroaliphatic diols $HOCH_2(CF_2)_3CH_2OH$, $HOCH_2CF_2CFH(CF_2)_3CFHCF_2CH_2OH$, $HOCH_2CH_2CH_2(CF_2)_3CH_2CH_2CH_2OH$ and $HOCH_2CF_2CH_2(CF_2)_3CH_2CF_2CH_2OH$. Also, U.S. Pat. No. 4,250,278 describes gum stock compositions comprising a fluoropolymer rubber containing —$CH_2$—$CF_2$— units in the polymeric chain, a vulcanizing agent, and a vulcanization accelerator, characterized in that the vulcanizing agent is a fluorine-containing polyhydroxy aliphatic compound, represented by the formula $R_f(CH_2OH)_2$ wherein $R_f$ is a polyfluoroalkylene or polyfluorochloroalkylene group having 1 to 24 carbon atoms. In each of these 3 references, the amount of fluoraliphatic diol used is said to be between about 0.5 and 10 parts by weight per one hundred parts of elastomer gum.

DISCLOSURE OF INVENTION

The present invention provides, in one aspect, a tacky fluoroelastomer gum stock composition, comprising a blend of fluoropolymer gum and fluoroaliphatic polyol, with said fluoroaliphatic polyol being present in excess of a curing amount. The preferred tacky fluoroelastomer gum stock compositions are a blend of:

(A) an elastomeric fluoropolymer gum, said gum being a copolymer of monomers comprising vinylidene fluoride and at least one other terminally ethylenically unsaturated fluorine-containing comonomer;

(B) from about 75 to about 750 parts by weight per one hundred parts by weight of said fluoropolymer gum, of a normally liquid fluoroaliphatic polyol, or a normally liquid mixture of two or more fluoroaliphatic polyols, said fluoroaliphatic polyol(s) preferably having: (1) carbon-carbon skeletal structure(s) which can be interrupted by oxygen atoms bonded only to carbon atoms, (2) non-skeletal valences of said structure(s) satisfied by H or F atoms, or OH or fluoroalkyl groups, with no more than 50% of such non-skeletal valences being satisfied by H atoms, and (3) for each said fluoroaliphatic polyol, at least two hydroxyl groups each bonded to carbon atoms bonded only to hydrogen atoms or fluoroalkyl groups; and (C) about 4 to 30 millimoles per one hundred grams of said fluoroelastomer gum, of one or more organo-onium cocuring agents selected from the group consisting of organoammonium, organoarsonium, organophosphonium, or organosulfonium compounds, preferably having the formulas:

| | | |
|---|---|---|
| (i) | $(R^1)_4Q^{+1}(X^{-m})_{1/m}$, | I |
| (ii) | $(R^1)_3QR^2Q(R^1)_3^{+2}(X^{-m})_{2/m}$, | II |
| (iii) | $(R^3)_3S^{+1}(X^{-m})_{1/m}$, or | III |
| (iv) | $(R^3)_2SR^4S(R^3)_2^{+2}(X^{-m})_{2/m}$ | IV | wherein Q is a nitrogen, arsenic, or phosphorus atom, S is sulfur, $X^-$ is an anion having a valence of m, each $R^1$ is a monovalent organic radical containing 1 to 20 carbon atoms which is the same as or different from any other $R^1$, and can combine with another $R^1$ to form a cyclic structure containing a Q atom, $R^2$ is a divalent organic radical containing from 2 to 12 carbon atoms, each $R^3$ is a monovalent organic radical containing 1 to 20 carbon atoms, is the same as or different from any other $R^3$, and can combine with another $R^3$ to form a cyclic structure containing an S atom, $R^4$ is a divalent organic radical having from 2 to 12 carbon atoms, and at least one $R^3$ or $R^4$ group is aromatic; which composition in reactive association with an acid acceptor forms a tacky curable gum stock composition which, upon exposure to heat, will cure into an elastomer.

The present invention also provides tacky curable gum stock compositions comprising a blend of said components (A), (B), and (C), and further comprising acid acceptor.

In addition, the present invention provides a method for making a shaped article from said tacky curable gum stocks.

DETAILED DESCRIPTION

Representative terminally ethylenically unsaturated fluorine-containing monomers which can be copolymerized with vinylidene fluoride to prepare an elastomeric fluoropolymer used in this invention include 1-chloro-1,2-difluoroethylene, chlorotrifluoroethylene, 1,2-dichloro-1,2-difluoroethylene, 1,1-chlorofluoroethylene, trifluoroethylene, tetrafluoroethylene, 1-hydroperfluoropropene, hexafluoropropene, 2-chloroperfluoropropene, vinyl fluoride, fluorinated methylvinylethers (such as $CF_3OCF=CF_2$), and combinations thereof. Fluorine-free olefins such as ethylene, propylene, 1-butene, isobutylene, butadiene, 2-chlorobutadiene, vinyl ethyl ether, vinyl chloride, and vinyl acetate can also be copolymerized with vinylidene fluoride and a terminally ethylenically unsaturated fluorine-containing monomer or monomers, but such fluorine-free olefins will decrease the thermal and chemical resistance of the resulting fluoropolymer. Preferably no more than about 10 mol percent of such fluorine-free olefins are copolymerized with vinylidene fluoride and the terminally ethylenically unsaturated fluorine-containing monomer or monomers.

Said fluoropolymers can be used to produce elastomeric articles. By "elastomeric", as used herein, is meant the ability of a substance, when slowly stretched at room temperature to at least twice its original length and released, to return rapidly to essentially its original length. The preparation of such fluoropolymer gums is known in the art and some of them are commercially available. Preferred fluoropolymer gums for use in this invention are those produced by copolymerizing 65 to 85 mol % vinylidene fluoride and 35 to 15 mol % hexafluoropropene as described, for example, in U.S. Pat. Nos. 3,051,677 and 3,318,854 and those fluoropolymer gums produced by copolymerizing vinylidene fluoride with 10 to 35 mol % hexafluoropropene and 15 to 25 mol % tetrafluoroethylene as described, for example, in U.S. Pat. No. 2,968,649.

Representative fluoroaliphatic polyols (B) useful in this invention include the monomers and oligomers of the following formulas, where a repeating group (i.e., a group enclosed in parentheses followed by the subscript "a", "b", or "c") of the oligomer can be repeated in a random or ordered fashion:

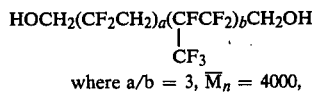

where a/b = 3, $\overline{M}_n$ = 4000,

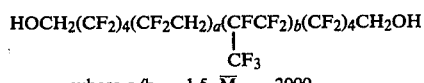

where a/b = 1.5, $\overline{M}_n$ = 2000, $HOCH_2CF_2CFH(CF_2)_nCFHCF_2CH_2OH$
where n = 2–12,
$HOCH_2CF_2(CF_2CFCl)_2CF_2CH_2OH$,

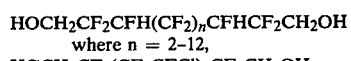

where a/b/c = 2/1/0.625, $\overline{M}_n$ = 3000,

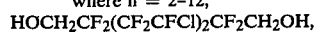

where a/b = 3, $\overline{M}_n$ = 3500,

-continued

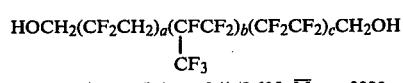

where a/b/c = 2/1/0.75, $\overline{M}_n$ = 4000,

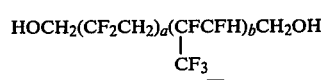

where a/b = 4, $\overline{M}_n$ = 2780,
$HOCH_2CF_2O(CF_2CF_2O)_a(CF_2O)_bCF_2CH_2OH$
where a/b = 0.5, $\overline{M}_n$ = 1500,
$HOCH_2CF_2OCF(CF_3)CF_2OCF(CF_3)CH_2OH$,
$HOCH_2CF(CF_3)O(CF_2)_5OCF(CF_3)CH_2OH$, and
$HOCH_2CF_2CF_2OCF_2CF_2CH_2OH$.

The fluoroaliphatic polyols used in this invention are normally liquid (i.e., the fluoroaliphatic polyols or mixtures thereof are liquids at ambient temperatures). The molecular weights of such fluoroaliphatic polyols can vary widely, e.g., the molecular weight can be as low as about 300 and as high as about 10,000.

Normally solid fluoroaliphatic polyols which can be combined with normally liquid fluoroaliphatic polyols to form normally liquid mixtures of fluoroaliphatic polyols include $HOCH_2(CF_2)_2CH_2OH$ and $HOCH_2(CF_2)_4CH_2OH$.

Preferred fluoroaliphatic polyols are diols with $-CF_2CF_2-$ repeating units in their backbone, such as 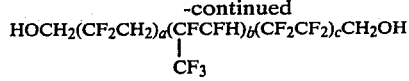 with a/b=about 4 (most preferably with a number average molecular weight of about 2000 to 4000).

Most of these fluoroaliphatic polyols are known, and are described in, for example, E. T. McBee et al, JACS, 74, 444–446 (1952), E. T. McBee et al, JACS, 75, 2324 (1953), U.S. Pat. Nos. 4,094,911, 3,574,770, 3,413,271, and 3,647,897, J. L. Zollinger et al, "Polymers in Space Research", 409–430 (Marcel Decker, Inc., N.Y. 1970), and J. D. LaZerte et al, JACS, 77, 910 (1955). The polyols of these publications are incorporated herein by reference. Also, some of said fluoroaliphatic polyols can be prepared by modifying precursors thereof shown in U.S. Pat. Nos. 2,968,649, 3,147,314, and 4,027,086, and Italian Patent No. 817,809 using techniques well known in the art (e.g., by reduction, oxidation, or esterification). The precursors of these references are also incorporated herein by reference. For example, fluoroaliphatic polyols can be prepared by copolymerizing perfluoroalkylene monomers such as vinylidene fluoride, tetrafluoroethylene, and hexafluoropropene, followed by oxidation, esterification, and reduction to yield a hydroxy-terminated fluoroaliphatic polyol.

In addition to the above fluoroaliphatic polyol curing agents, gum stocks of this invention can also contain minor amounts of conventional aromatic polyhydroxy fluoropolymer gum curing agents such as hydroquinone, 2-methyl hydroquinone, 2,5-dimethyl hydroquinone, 2-t-butyl hydroquinone, resorcinol, 2-methyl resorcinol, 5-methyl resorcinol, 2,4-dibenzoylresorcinol, catechol, 2,4-dihydroxy-acetophenone, 1,5-dihydroxynaphthalene, 9,10-dihydroxy-anthracene, 1,4,9,10-tetrahydroxyanthracene, 3,6-dihydroxyxanthone, 2,6-dihydroxyanthraquinone, 4,4'-dihydroxydiphenylsulfoxide, 4,4'-dihydroxydiphenylsulfone (Bisphenol S), 1,1-cyclohexylidene-bis(4-hydroxybenzene), 2-chloro-1,4-cyclohexylene-bis(4-hydroxybenzene), 2,2-isopropylidene-bis(4-hydroxybenzene) (Bisphenol A), hexafluoroisopropylidene-bis(4-hydroxybenzene) (Bisphenol AF), 2,4'-dihydroxybenzophenone, 4,4'-dihydroxybenzophenone, 2,2',4,4'-tetrahydroxybenzophenone, and 2-fluoro-1,4-phenylene-bis(4-hydroxy-benzene).

In the organoammonium, organoarsonium, or organophosphonium cocuring agents of formulas I and II above, the $R^1$ moiety can contain from 1 to about 20 carbon atoms, can have a carbon skeletal chain which is straight chain, branched, or cyclic, and is saturated, unsaturated or aromatic, which chain can contain hetero skeletal atoms (e.g., oxygen or sulfur) and can be unsubstituted or substituted with non-interfering moieties, i.e., moieties which do not interfere with the functioning of the compound as a cocuring agent. Also, the $R^2$ moiety preferably contains from 2 to 8 carbon atoms.

In the organosulfonium cocuring agents of formulas III and IV above, the $R^3$ moiety can have a carbon skeletal chain which is straight chain, branched, or cyclic, which chain can be saturated, unsaturated or aromatic, can contain hetero skeletal atoms (e.g., oxygen or sulfur) and can be unsubstituted or substituted with non-interfering moieties. Also, the $R^4$ moiety preferably contains from 2 to 8 carbon atoms.

In the above organo-onium cocuring agent formulas I to IV, suitable anions, X, include chloride, bromide, sulfate, bisulfate, nitrate, hydroxide, carbonate, perchlorate, trifluoromethane sulfonate, acetate, benzene sulfonate, phenate, tetrafluoroborate, hexachlorophosphate, hexafluorophosphate, hexachlorostannate, hexafluoroarsenate, and hexafluoroantimonate.

In the above cocuring agent formulas I to IV, $R^1$ and $R^3$ are preferably alkyl, alkenyl, cycloalkyl, phenyl, or combinations thereof such as alkenylcycloalkyl, alkylcycloalkenyl, alkenylphenyl, and the like, and $R^2$ and $R^4$ are alkylene, phenylene, or combinations thereof such as phenylenedialkylene, with at least one of $R^3$ and $R^4$ containing an aromatic nucleus with 6 ring-carbon atoms. The $R^1$, $R^2$, $R^3$, or $R^4$ groups can contain non-interfering substituents, i.e., substituents which do not interfere with the function of the compound as a cocuring agent, such as halo, alkoxy, alkylthio, phenylthio, carboalkoxy, acetoxy, and acetamido. Most preferably $R^1$, $R^2$, $R^3$ and $R^4$ are unsubstituted. In general, organophosphonium compounds are preferred as cocuring agents due to their ready availability.

Mixtures of said organo-onium cocuring agents can be used in this invention.

Representative organo-onium cocuring agents include:

$(CH_3)_4N^+OH^-$, $(C_4H_9)_4N^+Br^-$, $(HOCH_2CH_2)_3N^+CH_3I^-$, $HO^-(C_4H_9)_3N^+CH_2CH_2N^+(C_4H_9)_3OH^-$, $(C_2H_5)_3(C_6H_5)N^+Br^-$,

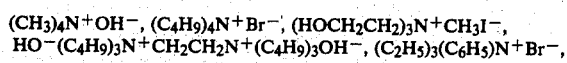

$(C_8H_{17})_3(CH_2=CHCH_2)N^+BF_4^-$, $(C_4H_9)_3(CF_3CH_2)N^+(SO_4^{-2})_{\frac{1}{2}}$,

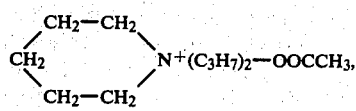

$(CH_3)_2(C_2H_5)_2P^+Cl^-$, $(C_2H_5)_3(C_{18}H_{37})P^+Br^-$,
$(C_3H_7)_3(cyclo-C_6H_{11})P^+OH^-$, $(C_4H_9)_3(CH_2=CHCH_2)P^+Cl^-$,
$(C_6H_5)_3(C_6H_5CH_2)P^+Cl^-$, $(C_6H_5)_3(C_6H_5COCH_2)P^{Br-}$,
$(C_8H_{17})_3(CH_3OCH_2CH_2)P^+NO_3^-$, $Cl^-+(C_6H_5)_3PCH_2C_6H_4CH_2P(C_6H_5)_3^+Cl^-$,

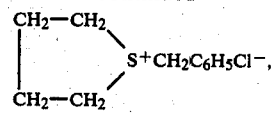

$(C_6H_5)_3S^+Cl^-$, $(C_6H_5)_3S^+(SO_4^{-2})_{\frac{1}{2}}$, $(C_6H_5)_3S^+PF_6^-$, $(C_6H_5)_2(CH_3)S^+BF_4^-$, diphenylnaphthylsulfonium trifluoromethanesulfonate, tritolylsulfonium nitrate, anisyldiphenylsulfonium hexafluoroantimonate, 4-butoxyphenyldiphenylsulfonium tetrafluoroborate, 4-chlorophenyldiphenylsulfonium acetate, tris(4-phenoxyphenyl)sulfonium hydroxide, di(4-ethoxyphenyl)methylsulfonium hexafluoroarsenate, 4-acetoxy-phenyldiphenylsulfonium carbonate, tris(4-thiomethoxyphenyl)sulfonium hexafluorophosphate, di(methoxysulfonylphenyl)methylsulfonium chloride, di(methoxynaphthyl)methylsulfonium tetrafluoroborate, tri(carbomethoxyphenyl)sulfonium hexafluorophosphate, and 4-acetamidophenyldiphenylsulfonium perchlorate.

Synthetic routes to the above organo-onium compounds are well-known and are described, for example, in "Concerning Amines", David Ginsburg, (Pergamon Press, New York, 1967) page 73; "Psuedohalo Metal Compounds XVIII", Beck et al, Chem Ber, 100, 2335–61 (1967) (arsenic), "Organic Phosphorus Compounds", G. M. Kosolapoff and L. Maier, (Wiley-Interscience, New York, 1972) Vol. 2, page 189; J. Org. Chem., G. H. Wiegand, et al, 33, 2671–75(1968) (sulfur); J. Org. Chem., K. Ohkubo, et al, 36, 3149–55(1971) (sulfur); "Topics in Sulfur Chemistry", J. P. Marino, (Georg Thieme, Stuttgart, 1976) page 32; and U.S. Pat. No. 2,807,648, the teachings of which are incorporated herein by reference.

Prior to curing, an acid acceptor (preferably an inorganic base) is added to the fluoroelastomer gum stock to provide a curable gum stock or compound. Suitable acid acceptors include calcium hydroxide, magnesium oxide, lead oxide, calcium oxide, dibasic lead phosphite, zinc oxide, barium carbonate, and strontium hydroxide. Mixtures of more than one acid acceptor may be used in this invention. Preferred acid acceptors are calcium hydroxide and magnesium oxide, with magnesium oxide being most preferred.

Other gum stock ingredients commonly used as compounding adjuvants for fluoropolymer gums can also be included in the curable gum stock, such as processing aids, lubricants, plasticizers, and fillers (e.g., high surface area carbon blacks, iron oxides, and amorphous silicas).

Use of high molecular weight fluoroaliphatic polyols (i.e., those with a number average molecular weight greater than about 1200) results in a gum stock having a lower Mooney viscosity than the Mooney viscosity of the fluoropolymer gum. Due to the low Mooney viscosity of the compositions of this invention containing high molecular weight fluoroaliphatic polyols, such compositions are readily processible and increased amounts of filler can be added thereto without causing excessive hardness in the cured gum stock.

The amounts of each component (A), (B), and (C), and any compounding adjuvants used will depend upon the proposed application and desired cure characteristics. The tacky gum stocks of this invention are prepared by adding a sufficiently large proportion of fluoroaliphatic polyol to the gum stock to render the same capable of adhering to itself. Suggested concentration ranges for producing a tacky curable gum stock are shown below. The term "parts" refers to parts by weight of fluoropolymer gum. The term "phr" refers to parts per hundred parts of fluoropolymer gum. The term "mmhr" refers to millimoles per hundred grams of fluoropolymer gum:

| Gum stock component | Amount | Preferred Amount |
|---|---|---|
| fluoropolymer gum | 100 parts | 100 parts |
| fluoroaliphatic polyol | 75 to 750 phr | 150 to 500 phr |
| organo-onium cocuring agent | 4 to 30 mmhr | 10 to 20 mmhr |
| acid acceptor | 4 to 80 phr | 10 to 50 phr |

The tacky curable gum stocks of the present invention generally can be compounded by first mixing the fluoropolymer gum(s) (A), acid acceptor(s) (D), and any adjuvants such as fillers, using a mixing device such as a roll mill. The resulting mixture can then be combined with a solvent in which the fluoropolymer gum is soluble, such as methyl ethyl ketone, at a level of about 50% by weight of solids to solvent. The resulting solution of fluoropolymer gum in solvent can have dispersed in it the acid acceptor and any non-soluble adjuvants such as fillers. Next, the fluoroaliphatic polyol(s) can be added to the solution/dispersion, followed by the organo-onium cocuring agent(s). The final mixture can be used immediately or stored, e.g., for periods of up to about 3 months or more.

Mixing of the tacky curable gum stock components can be carried out using any of the usual rubber mixing devices, such as Banbury mixers, roll mills, or any other convenient mixing device. The temperature of the mixture on the mill generally should not be allowed to rise above about 120° C. The mixture should be milled sufficiently to distribute all ingredients throughout the gum stock. About 5 to 20 minutes or longer is recommended for this process.

The tacky curable gum stock is shaped by molding or extruding and thermally cured into a useful elastomeric product. Forming a shaped article by molding typically comprises pressing the tacky curable gum stock in a hot mold, releasing the shaped part from the mold, and (to develop optimum properties) subsequently post curing the part in an oven. The mold can first be coated with a release agent, such as a silicone oil. Molding can be carried out at a temperature between about 95° C. and about 230° C., preferably between about 150° C. and about 205° C., for a period of from about 1 minute to 15 hours, usually from 5 minutes to 30 minutes, and at a pressure of between about 0.7 MPa and about 20.6 MPa, preferably between about 3.4 MPa and about 6.8 MPa. The vulcanized molded article can be post cured at a temperature between about 150° C. and about 315° C., usually at about 240° C. to 260° C., for a period of from about 4 hours to 24 hours or more depending on the cross-sectional thickness of the sample. The temperature during the post cure usually is raised gradually from the lower limit of the range to the desired maximum temperature selected.

Alternatively, the tacky curable gum stock can be shaped by extrusion rather than molding. Extrusion typically comprises heating the curable gum stock to a temperature of about 100° C. and forcing it through a suitable die or orifice at a pressure of between about 330 MPa and about 400 MPa. The shaped extrudate can then be press cured as above, or, alternatively, steam autoclaved at a temperature of between about 135° C. and about 160° C., for a period from about 30 minutes to 4 hours. The vulcanized extruded article can then be post cured in the same manner as a molded article.

In roll building applications the tacky curable gum stock is typically extruded and calendered to form a thin sheet which is then wrapped around a central mandrel. Because the calendared sheet is tacky, it is not necessary to use an adhesion-promoting coating to bind together successive turns of the roll. The roll can be wrapped with a temporary cover such as a layer of water-wet nylon tape and steam cured. After curing, the temporary cover is removed.

For repair of cured fluoroelastomer articles, or adhering together of uncured fluoroelastomer articles, the tacky curable gum stock (preferably dissolved or dispersed in a suitable carrier, e.g., methyl ethyl ketone) is applied to the areas to be bonded, e.g., by brushing or spraying. The areas to be bonded are then pressed together and cured using heat. Preferably, pressure is applied during cure to the areas to be bonded.

This invention therefore provides tacky curable fluoroelastomer gum stocks which adhere to, e.g., uncured or cured fluoroelastomer. The curable gum stocks of this invention can be vulcanized into elastomeric articles, such as gaskets, O-rings, hose, etc., having good physical properties, initially and after exposure to elevated temperatures, and having lower durometer hardness when compared to conventionally cured fluoropolymer gums.

The following examples are offered to aid understanding of the present invention and are not to be construed as limiting the scope thereof. Curing characteristics are reported under the heading "Rheometer". Data were obtained in accordance with ASTM D 2084-75 using an Oscillating Disk Rheometer (Model "MP-V", commercially available from Monsanto Company, with a 20 second preheat, a 100 cpm oscillator frequency, and a 3° arc).

EXAMPLES 1-3

A fluoroaliphatic diol of the formula HOCH$_2$[(CF$_2$CH$_2$)$_a$(CFCF$_3$CF$_2$)$_b$]CH$_2$OH with the units in parenthesis being randomly distributed within the brackets, a/b=4, and $\overline{M}_n$=2780 was prepared by esterifying a —COOH terminated copolymer of vinylidene fluoride and hexafluoropropene (see U.S. Pat. No. 3,147,314) with methanol using sulfuric acid as catalyst. The resulting methyl ester was reduced with sodium borohydride according to the procedure of U.S. Pat. No. 3,647,891 to yield the desired —CH$_2$OH terminated fluoroaliphatic polyol.

Tacky curable fluoropolymer gum stock compositions were prepared by compounding together "low Mooney" fluoropolymer gum, the above-described fluoroaliphatic diol, organo-onium cocuring agent, acid acceptor(s), and filler. The gum stock compositions were mixed by putting the gum on the mill, adding the curing and cocuring agents as a group, adding all other ingredients as a group, and cutting the mixture back and forth until all ingredients were well dispersed. Uncured sheets of these tacky gum stock compositions could be stuck to themselves using hand pressure. Cure characteristics of the several compositions were determined and are set forth below in Table I:

TABLE I

| Ingredient | Composition of curable gum stock Example | | |
|---|---|---|---|
| | 1 | 2 | 3 |
| Fluoropolymer gum[a] (parts) | 100 | 100 | 100 |
| Fluoroaliphatic diol (phr) | 150 | 400 | 400 |
| (n-$C_4H_9$)$_3$($CH_2$=$CHCH_2$)$P^+Cl^-$ (mmhr) | 9 | 18 | 18 |
| Ca(OH)$_2$ (phr) | 15 | 30 | — |
| MgO[b] (phr) | 7.5 | 15 | 45 |
| ASTM N-990 carbon black[c] (phr) | 12.5 | 25 | 25 |
| Tetramethylenesulfone[d] (phr) | 2.5 | 5 | — |

[a] $CF_2$=$CH_2$/$CF_3CF$=$CF_2$ copolymer, 80/20 mole percent, Mooney viscosity (ML 1 + 10) at 121° C. = 28
[b] "Maglite D", commercially available from Merck Chemical Co.
[c] "Thermax MT", commercially available from Thermatomic Carbon Co.
[d] Cure accelerator

| Properties of cured gum stock | | | |
|---|---|---|---|
| | 1 | 2 | 3 |
| Rheometer, 177° C.: | | | |
| $M_L$ (N · m) | 0.17 | 0 | 0.06 |
| $M_H$ (N · m) | 4.7 | 3.4 | 5.1 |
| Min. to $M_H$ | 12 | 24 | 60 |
| $t_{s1}$ | 3.4 | 4.1 | 21 |
| $t'_c$ (90) | 7.3 | 16 | 51 |

Each of the tacky gum stock compositions of Examples 1-3 cured to a tack-free elastomer.

EXAMPLE 4

Methyl ethyl ketone (MEK) solution/dispersions containing 50 percent by weight of the compositions of Examples 1 through 3 were separately prepared by milling together the fluoropolymer gum, acid acceptors, and filler. The resulting mixture was then dissolved and dispersed in MEK, the fluoropolymer gum being dissolved in MEK and the acid acceptors and filler being dispersed in MEK. The fluoroaliphatic diol, organo-onium cocuring agent, and tetramethylenesulfone cure accelerator were next dissolved into the solution/dispersion. The three solution/dispersions containing the compositions of Examples 1 through 3 were then stored at about 23° C. and their viscosities monitored. The solution/dispersions containing the compositions of Example 1 and Example 2 gelled within an 8 hour period. The solution/dispersion containing the composition of Example 3 had an initial viscosity of 80 cp which increased to 90 cp after 4 days and then remained at 90 cp after 18 days and after 3 months indicating that it had particularly good shelf stability.

EXAMPLE 5

A 50 weight percent MEK solution/dispersion containing the composition of Example 3 was prepared as described in Example 4. Sheets of asbestos cloth were dipped into this solution/dispersion, then withdrawn slowly and air dried for about 3 hours at about 23° C. to allow the MEK to evaporate, resulting in a tacky coating of curable gum stock, approximately 2.5 micrometers thick, on each face of the asbestos sheets.

The coated sheets adhered readily to one another but could be easily separated with only a light to moderate pulling force. Heating paired, pressed-together coated sheets for 30 min. at 177° C. (or 24 hours at 120° C.) resulted in cured, tack-free, tough, thermally stable, solvent resistant fluoroelastomer laminates.

Painting the MEK solution/dispersion on a compounded calendered, uncured $CF_2$=$CH_2$/$CF_3CF$=$CF_2$ fluoroelastomer sheet and allowing the solvent to evaporate gave a tacky, adhesive film on the surface of the fluoroelastomer sheet. A second sheet of compounded, uncured, uncoated fluoroelastomer was placed in contact with the coated tacky sheet and the two sheets and coating layer cured by heating at 177° C. for 30 min. to yield a strong, thermally stable, solvent resistant fluoroelastomer laminate.

EXAMPLE 6

A tacky curable gum stock composition was prepared by compounding together fluoropolymer gum, fluoroaliphatic diol, organo-onium co-curing agent, acid acceptor, and filler. The resulting curable gum stock composition was mixed, cured, and evaluated as in Example 1. Curing characteristics of the composition are set forth in Table II.

TABLE II

| Composition of curable gum stock | |
|---|---|
| Ingredient | Amount |
| Fluoropolymer gum[a] (parts) | 100 |
| Fluoroaliphatic diol[b] (phr) | 400 |
| (n-$C_4H_9$)$_3$($CH_2$=$CHCH_2$)$P^+Cl^-$ (mmhr) | 18 |
| MgO (phr) | 45 |
| ASTM N-990 carbon black (phr) | 25 |

| Properties of cured gum stock | |
|---|---|
| Rheometer, 177° C.: | |
| $M_L$ (N · m) | 0.06 |
| $M_H$ (N · m) | 1.70 |
| Min. to $M_H$ | 60 |
| $t_{s1}$ | 10 |
| $t'_c$ (90) | 38 |

[a] $CF_2$=$CH_2$/$CF_3CF_2CF_2$, 80/20 mol percent, as in Example 1.
[b] HOCH$_2$(CF$_2$)$_4$[(CF$_2$CH$_2$)$_a$(CF$_2$CF)$_b$](CF$_2$)$_4$CH$_2$OH, with CF$_3$ branch, a/b = 1.86, a viscous, amber liquid with $\bar{M}_n$ = 3000, prepared as described in U.S. Pat. No. 3,647,891.

The tacky gum stock of this Example cured to a tack-free elastomer.

EXAMPLE 7

A 50 weight percent MEK solution/dispersion containing the composition of Example 6 was prepared as described in Example 4. The solution/dispersion was painted on a compounded, calendered uncured $CF_2$=$CH_2$/$CF_3CF$=$CF_2$ fluoropolymer sheet and the solvent was allowed to evaporate for one hour to give a tacky, adhesive film on the surface of the fluoropolymer sheet. A second sheet of compounded, uncured, uncoated fluoropolymer was placed in contact with the coated tacky sheet and the resulting sandwich assembly heated for one hour at 163° C. in a steam autoclave at a steam pressure of 6.3 kg/cm$^2$, to yield a cured laminate. The bond strength between the two laminated sheets was measured using a T-Peel test (ASTM D-1876-72), and found to be 3.20 kg per lineal cm with failure within the elastomer.

A second uncured, sandwich assembly containing the above tacky film-coated fluoropolymer sheet and uncured, uncoated fluoropolymer sheet remained easy to pull apart (but still curable) after three weeks at room temperature.

Repeating the above-described laminating and curing procedure, using cured fluoroelastomer sheets in place of uncured fluoropolymer sheets, gave a weakly bonded laminate after heating in the steam autoclave as described. However, when a weight (19.7 kg/cm$^2$) was placed on the laminate before heating in the steam autoclave, a stronger bond strength of 0.32 kg/cm with mainly adhesive failure was obtained as measured in the T-Peel Test.

Repeating this example once more, using cured fluoroelastomer sheets whose surfaces to be bonded had been roughened with an abrasive wheel, gave a cured laminate with an improved bond strength of 0.55 kg/cm after heating the weighted, sandwich assembly in the steam autoclave as described.

EXAMPLE 8

This example illustrates the construction of an elastomer roll using a curable tackifier of this invention.

A compounded, calendered, uncured $CF_2=CH_2/CF_3CF=CF_2$ fluoropolymer sheet (7.6 cm wide × 23 cm long × 0.18 cm thick) was coated on one surface with a 50% weight percent MEK solution/dispersion containing the composition of Example 6. The solvent was allowed to evaporate for about one hour. The sheet was next rolled up in the long dimension (tacky surface inside) on a 0.64 cm diameter steel rod. The resulting spiral roll was placed in a circulating air oven at 163° C. and heated for 1 hr. to yield a cured roll in which the successive layers in the roll were firmly bonded to each other. A knife cut through the roll exposed a continuous fluoroelastomer phase with no evidence of layered construction on visual inspection.

Various modifications and alterations of this invention will be apparent to those skilled in the art without departing from the scope and spirit of this invention and the latter should not be restricted to that set forth herein for illustrative purposes.

What is claimed is:

1. A tacky fluoroelastomer gum stock composition, comprising a blend of:
   (a) an elastomeric fluoropolymer gum, said gum being a copolymer of monomers comprising vinylidene fluoride and at least one other terminally ethylenically unsaturated fluorine-containing co-monomer;
   (b) from about 75 to about 750 parts by weight per one hundred parts by weight of said fluoropolymer gum, of a normally liquid fluoroaliphatic polyol, or a normally liquid mixture of two or more fluoroaliphatic polyols; and
   (c) about 1 to 20 millimoles per one hundred grams of said fluoropolymer gum, of one or more organo-onium cocuring agent(s) selected from the group consisting of organoammonium, organoarsonium, organophosphonium, or organosulfonium compounds
which composition in reactive association with an acid acceptor forms a tacky curable gum stock composition which, upon exposure to heat, will cure into an elastomer.

2. A composition according to claim 1, wherein said fluoroaliphatic polyol(s) have (1) a carbon-carbon skeletal structure(s) which can be interrupted by oxygen atoms bonded only to carbon atoms, (2) non-skeletal valences of said structure(s) satisfied by H or F atoms, or OH or fluoroalkyl groups, with no more than 50% of such non-skeletal valences being satisfied by H atoms, and (3) for each said fluoroaliphatic polyol, at least two hydroxyl groups each bonded to carbon atoms bonded only to hydrogen atoms or fluoroalkyl groups.

3. A composition according to claim 1, wherein said fluoroaliphatic polyol(s) have $-CF_2CH_2-$ repeating units in their backbone.

4. A composition according to claim 1, wherein said fluoroaliphatic polyol is $HOCH_2(CF_2CH_2)_a(CFCF_3CF_2)_bCH_2OH$ with $a/b=$ about 4.

5. A composition according to claim 4, wherein said fluoroaliphatic polyol has a number average molecular weight of about 2000 to 4000.

6. A composition according to claim 1, wherein said organo-onium cocuring agent(s) are selected from compounds having the formulas:

(i) $(R^1)_4Q^{+1}(X^{-m})_{1/m}$, (ii) $(R^1)_3QR^2Q(R^1)_3^{+2}(X^{-m})_{2/m}$, (iii) $(R^3)_3S^{+1}(X^{-m})_{1/m}$, or (iv) $(R^3)_2SR^4S(R^3)_2^{+2}(X^{-m})_{2/m}$ wherein Q is a nitrogen, arsenic or phosphorus atom, S is sulfur, $X^-$ is an anion having a valence of m, each $R^1$ is a monovalent organic radical containing 1 to 20 carbon atoms, is the same as or different from any other $R^1$, and can combine with another $R^1$ to form a cyclic structure containing a Q atom, $R^2$ is a divalent organic radical containing 2 to 12 carbon atoms, each $R^3$ is a monovalent organic radical containing 1 to 20 carbon atoms, is the same as or different from any other $R^3$, and can combine with another $R^3$ to form a cyclic structure containing an S atom, $R^4$ is a divalent organic radical containing 2 to 12 carbon atoms, and at least one $R^3$ or $R^4$ group is aromatic.

7. A composition according to claim 1, further comprising acid acceptor.

8. A composition according to claim 1, comprising about 150 to about 500 parts of said fluoroaliphatic polyol per one hundred parts of said fluoropolymer gum.

9. A composition according to claim 1, comprising about 10 to about 20 millimoles of said organo-onium cocuring agent per one hundred grams of said fluoropolymer gum.

10. A method of making a shaped article, comprising the steps of:
   (a) admixing with fluoropolymer gum, per one hundred grams thereof, from about 75 to 750 grams of normally liquid fluoroaliphatic polyol or normally liquid mixture of fluoroaliphatic polyols, said polyol(s) having: (1) carbon-carbon skeletal structure(s) which can be interrupted by oxygen atoms bonded only to carbon atoms, (2) non-skeletal valences of said structure(s) satisfied by H or F atoms, or OH or fluoroalkyl groups, with no more than 50% of such non-skeletal valences being satisfied by H atoms, and (3) for each said fluoroaliphatic polyol, at least two hydroxyl groups each bonded to carbon atoms bonded only to H atoms or fluoroalkyl groups; from about 4 to 30 millimoles of organo-onium cocuring agent selected from compounds of the formulas (i) $(R^1)_4Q^{+1}(X^{-m})_{1/m}$, (ii) $(R^1)_3QR^2Q(R^1)_3^{+2}(X^{-m})_{2/m}$, (iii) $(R^3)_3S^{+1}(X^{-m})_{1/m}$, or (iv) $(R^3)_2SR^4S(R^3)_2^{+2}(X^{-m})_{2/m}$ wherein Q is a nitrogen, arsenic or phosphorus atom, S is sulfur, $X^-$ is an anion having a valence of m, each $R^1$ is a monovalent organic radical containing 1 to 20 carbon atoms, is the same as or different from any other $R^1$, and can combine with another $R^1$ to form a cyclic structure containing a Q atom, $R^2$ is a divalent organic radical containing 2 to 12 carbon atoms, each $R^3$ is a monovalent organic radical containing 1 to 20 carbon atoms, is the same as or different from any other $R^3$, and can combine with another $R^3$ to form a cyclic structure containing an S atom, $R^4$ is a divalent organic radical containing 2 to 12 carbon atoms; and at least one $R^3$ or $R^4$ group is aromatic; and from about 0.5 to 40 grams of acid acceptor;

(b) shaping said admixture by molding, extruding, or applying said admixture to one or more surfaces comprising cured or uncured fluoroelastomer; and (c) subjecting said shaped admixture to sufficient heat and pressure to form a vulcanized shaped article.

* * * * *